United States Patent
Wang et al.

(10) Patent No.: US 9,405,347 B2
(45) Date of Patent: Aug. 2, 2016

(54) POWER-SAVING OPERATING SYSTEM FOR VIRTUAL ENVIRONMENT

(75) Inventors: Haiyong Wang, Redmond, WA (US);
Brandon S. Baker, Redmond, WA (US);
Shuvabrata Ganguly, Seattle, WA (US);
Nicholas Stephen Judge, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1667 days.

(21) Appl. No.: 12/394,017

(22) Filed: Feb. 26, 2009

(65) Prior Publication Data

US 2010/0218183 A1 Aug. 26, 2010

(51) Int. Cl.
*G06F 9/455* (2006.01)
*G06F 1/32* (2006.01)

(52) U.S. Cl.
CPC .......... *G06F 1/3228* (2013.01); *G06F 9/45558* (2013.01); *G06F 2009/45575* (2013.01); *G06F 2009/45591* (2013.01); *Y02B 60/148* (2013.01)

(58) Field of Classification Search
USPC .................................................. 718/1
See application file for complete search history.

(56) References Cited

U.S. PATENT DOCUMENTS

| | | | |
|---|---|---|---|
| 5,511,217 A * | 4/1996 | Nakajima et al. | 718/100 |
| 5,758,137 A | 5/1998 | Armstrong, Jr. | |
| 5,845,138 A * | 12/1998 | Nowlin, Jr. | 713/323 |
| 6,055,643 A * | 4/2000 | Chaiken | 713/323 |
| 7,103,745 B2 | 9/2006 | Koning | |
| 7,225,441 B2 | 5/2007 | Kozuch | |
| 7,251,815 B2 | 7/2007 | Donovan | |
| 7,386,749 B2 | 6/2008 | Rifani | |
| 7,475,002 B1 | 1/2009 | Mann | |
| 7,725,559 B2 * | 5/2010 | Landis et al. | 709/215 |
| 7,765,543 B1 * | 7/2010 | Weissman et al. | 718/1 |
| 7,797,512 B1 * | 9/2010 | Cheng et al. | 712/10 |
| 7,802,073 B1 * | 9/2010 | Cheng et al. | 712/10 |
| 7,971,203 B2 * | 6/2011 | Lantz et al. | 718/1 |
| 8,127,168 B2 * | 2/2012 | Maeda et al. | 713/330 |
| 2002/0099753 A1 * | 7/2002 | Hardin et al. | 709/1 |

(Continued)

FOREIGN PATENT DOCUMENTS

| | | | | |
|---|---|---|---|---|
| EP | 2202639 A1 * | 6/2010 | | G06F 9/455 |
| WO | WO 2009/004757 | * | 1/2009 | G06F 9/46 |

OTHER PUBLICATIONS

Wikipedia. "Advanced Configuration and Power Interface". © Feb. 26, 2009. http://en.wikipedia.org/w/index.php?title=Advanced_Configuration_and_Power_Interface&oldid=194137717.*

(Continued)

*Primary Examiner* — Jacob A Petranek
(74) *Attorney, Agent, or Firm* — Judy Yee; John Jardine; Micky Minhas

(57) ABSTRACT

Principles for enabling power management techniques for virtual machines. In a virtual machine environment, a physical computer system may maintain management facilities to direct and control one or more virtual machines executing thereon. In some techniques described herein, the management facilities may be adapted to place a virtual processor in an idle state in response to commands from a guest operating system. One or more signaling mechanisms may be supported such that the guest operating system will command the management facilities to place virtual processors in the idle state.

20 Claims, 4 Drawing Sheets

(56) References Cited

U.S. PATENT DOCUMENTS

| | | | |
|---|---|---|---|
| 2002/0184288 A1 | 12/2002 | Vargas | |
| 2003/0101440 A1 | 5/2003 | Hardin | |
| 2003/0153368 A1 | 8/2003 | Bussan | |
| 2004/0236875 A1 | 11/2004 | Jinzaki | |
| 2005/0246453 A1* | 11/2005 | Erlingsson et al. | 710/1 |
| 2006/0020842 A1 | 1/2006 | Olsen | |
| 2006/0075402 A1 | 4/2006 | Neiger | |
| 2006/0206891 A1 | 9/2006 | Armstrong | |
| 2006/0225073 A1 | 10/2006 | Akagawa | |
| 2006/0288349 A1 | 12/2006 | Zimmer | |
| 2007/0028244 A1 | 2/2007 | Landis | |
| 2007/0033589 A1 | 2/2007 | Nicholas | |
| 2007/0130305 A1 | 6/2007 | Piper | |
| 2007/0300218 A1 | 12/2007 | Mann | |
| 2008/0028411 A1 | 1/2008 | Cherkasova | |
| 2008/0062957 A1 | 3/2008 | Narasimha | |
| 2008/0147946 A1 | 6/2008 | Pesavento | |
| 2008/0313483 A1 | 12/2008 | Pasupuleti Sureshbabu | |
| 2009/0113422 A1* | 4/2009 | Kani | 718/1 |
| 2009/0235247 A1* | 9/2009 | Cho et al. | 718/1 |
| 2009/0265715 A1* | 10/2009 | Erlingsson et al. | 719/310 |
| 2010/0115315 A1* | 5/2010 | Davis et al. | 713/323 |
| 2010/0192149 A1* | 7/2010 | Lathrop et al. | 718/1 |

OTHER PUBLICATIONS

Hewlett-Packard Corporation et al. "Advanced Configuration and Power Interface Specification", © Oct. 2006, Revision 3.0b, Chapter 2.*

Linux, "ParavirtBenefits," http://virt.kernelnewbies.org/ParavirtBenefits, retrieved Dec. 22, 2008.

Microsoft, "Windows Server 2008 Power Savings," Jun. 2008, http://download.microsoft.com/download/4/5/9/459033a1-6ee2-45b3-ae76-a2dd1da3e81b/Windows_Server_2008_Power_Savings.docx.

Nathuji, R., "VirtualPower: Coordinated Power Management in Virtualized Enterprise Systems," SOSP '07, Oct. 14-17, 2007, Stevenson, WA, http://www.sosp2007.org/papers/sosp111-nathuji.pdf.

U.S. Appl. No. 12/234,353, filed Sep. 19, 2008, Haiyong Wang.

Yu, "[Xen-devel] [Patch] Deferrable Timer", Jul. 17, 2008.

Kelem, "A Separation Model for Virtual Machine Monitors", Proceedings of the IEEE Computer Society Symposium on Research in Security and Privacy, May 20-22, 1991.

Dhiman, "vGreen: A System for Energy-Efficient Management of Virtual Machines", ACM Transactions on Design Automation of Electronic Systems, vol. 16, No. 1, Nov. 2010.

Microsoft, "Using Kinect for Windows with a Virtual Machine", as captured on archive.org on Dec. 18, 2012.

Fenn, "An Evaluation of KVM for Use in Cloud Computing", 2nd International Conference on the Virtual Computing Initiative (ICVCI '08), May 15-16, 2008.

Ben-Ari, "Ada for Software Engineers", 2005.

What-is-What.com, "What is a Virtual Machine?", May 27, 2007.

Kegior, "What is Virtualization", Sep. 2, 2011.

Verma, "Integrated Real-time Systems", Masters Thesis, Jan. 7, 2007.

Microsoft, "Windows Timer Coalescing", Jan. 20, 2009.

Microsoft, "I/O Device Serialization and Virtualization", Aug. 4, 2004.

Brady, "Virtualization and CPU Wait Times in a Linux Guest Environment", Journal of Computer Resource Management, Issue 116, Fall 2005.

Aron, "Soft Timers: Efficient Microsecond Software Timer Support for Network Processing", ACM Transactions on Computer Systems, vol. 18, No. 3, Aug. 2000.

"Proceedings of the Linux Symposium", Ottawa, Ontario, Canada, Jun. 27-30, 2007.

Ben-Yehuda, "The Price of Safety: Evaluating IOMMU Performance", Proceedings of the Linux Symposium, Jun. 27-30, 2007.

Brown, "ACPI in Linux®— *Myths* vs. *Reality*", Proceedings of the Linux Symposium, Jun. 27-30, 2007.

Forbes, "Why Virtualization Fragmentation Sucks", Proceedings of the Linux Symposium, Jun. 27-30, 2007.

Tian, "How virtualization makes power management different", Proceedings of the Linux Symposium, Jun. 27-30, 2007.

Kivity, "kvm: the Linux Virtual Machine Monitor", Proceedings of the Linux Symposium, Jun. 27-30, 2007.

Lutterkort, "Manageable Virtual Appliances", Proceedings of the Linux Symposium, Jun. 27-30, 2007.

Nakajima, "Hybrid-Virtualization—Enhanced Virtualization for Linux", Proceedings of the Linux Symposium, Jun. 27-30, 2007.

Potzl, "Linux-VServer", Proceedings of the Linux Symposium, Jun. 27-30, 2007.

Russell, "lguest: Implementing the little Linux hypervisor", Proceedings of the Linux Symposium, Jun. 27-30, 2007.

Siddha, "Getting maximum mileage out of tickless", Proceedings of the Linux Symposium, Jun. 27-30, 2007.

* cited by examiner

POWER-SAVING OPERATING SYSTEM FOR VIRTUAL ENVIRONMENT

BACKGROUND

The amount of power drawn by a computing device has become an important consideration in recent years, both for battery-powered devices (e.g., mobile devices) and those having other power sources. Various techniques have been proposed for decreasing the power consumption, and increasing the power saving, of computing devices. One such technique carried out by operating systems (OSs) is placing the processors (e.g., processor chips, or processor cores of a multi-core chip) of a computing device into an idle, low-power state when the processors are not being used. In these techniques, an entire chip may be placed in the idle state, or, in the case of multi-core chip, only some of the cores of a chip may be placed in the idle state.

The power-saving that results from placing a processor into the idle state may vary between processors, and may be dependent on the functionality of that processor. For example, some processors may be adapted to wake from an idle state upon receipt of every interrupt signal. The processor may receive a clock interrupt signal at very short intervals (e.g., for some computing devices, about every 15 milliseconds) and wake from the idle state upon receipt of the clock interrupt to update its time records. Power-saving may be negligible if the processor is being woken from the idle state frequently.

Other processors may support an idle state which permits the processor to be placed into an idle state in which interrupt signals—including the clock interrupt—are masked/disabled. In this state, the processor may not wake for each interrupt, and interrupts like the clock interrupt may be skipped. By placing the processor into a state with interrupts disabled, the processor may remain in the idle state longer, rather than waking for each interrupt after a short time. Accordingly, some operating systems may only place a processor into an idle state when that processor supports an idle state that masks interrupts.

An operating system may place a processor into the idle state when it detects that there is no processing burden on that processor. An operating system may also use "core parking" when it detects that the total processing burden on a multi-core chip is low enough that the burden can be consolidated onto a subset of available cores, such that the newly-freed cores may be placed into the idle state.

SUMMARY

Conventionally, application of power-saving techniques has been limited to physical processors and cores of physical computer systems—the elements of a computer system that use power. However, a real power savings is achieved when power savings techniques are applied to non-physical components of a computer system. These non-physical components of the computer system may include virtual machines, which are software abstractions of a computer having virtual processors that can run guest operating systems.

Described herein are principles for enabling power management techniques for virtual machines. In a virtual machine environment, a physical computer system may maintain management facilities to direct and control one or more virtual machines executing thereon. In some techniques described herein, the management facilities may be adapted to place a virtual processor in an idle state in response to commands from a guest operating system. One or more signaling mechanisms may be supported such that the guest operating system will command the management facilities to place virtual processors in the idle state.

In some embodiments, this signaling mechanism may involve the management facilities responding to a query from an operating system with an indication that the processor on which the operating system is executing supports an idle state. This indication of a supported idle state may be made regardless of whether the operating system performs differently when executing on a virtual processor and even in scenarios in which the underlying hardware processor does not support the idle state. For example, the management facilities may respond to a call on an ACPI interface that the processor on which the operating system is executing supports power saving state C2, even if the underlying hardware does not. Though, in embodiments in which the operating system is configured to operate differently when executing on a virtual processor, the signaling mechanism may involve a read from a hardware register or other action that causes the management facilities to respond.

In some embodiments, the management facilities may provide virtual processor(s) that support Intelligent Timer Tick Distribution (ITTD), increasing the amount of time that the virtual processor is in an idle state. When this capability is supported, the signaling mechanism may include an indication that this capability is supported.

In one embodiment, there is provided a method of lowering power consumption of a physical computing device on which is executing a management facility to provide a virtual machine environment. The virtual machine environment comprises a virtual machine, and the computing device further comprises an operating system executing on the virtual machine. The method comprises intercepting, with the management facility, a query from the operating system, the query seeking an indication that the processor executing the operating system supports an idle state, and in response to the query, informing the operating system that the at least one virtual processor supports the idle state when a physical processor of the at least one physical computing device does not support the idle state.

In another embodiment, there is provided at least one computer-readable storage medium encoded with computer-executable instructions that, when executed by a physical processor of a physical computing device on which is executing a virtual machine environment, cause the physical computing device to carry out a method for operating a management facility of the virtual machine environment to enable power-saving techniques for a virtual machine. The virtual machine comprises at least one virtual processor on which a guest operating system executes. The method comprises receiving, at the management facility, a query from the guest operating system, the query seeking whether the at least one virtual processor of the virtual machine supports the idle state, and informing the guest operating system that the at least one virtual processor does support the idle state. The method further comprises placing the at least one virtual processor into the idle state in response to an instruction from the guest operating system, receiving an interrupt request for the at least one virtual processors, and performing at least one initialization step on the at least one virtual processor. The method further comprises, upon completion of the at least one initialization step, permitting the at least one virtual processor to carry out a function identified by the interrupt request.

In a further embodiment, there is provided a physical computing device on which is executing a virtual machine environment, the virtual machine environment supporting execution of at least one virtual machine, the at least one virtual machine comprising at least one virtual processor and executing a guest operating system. The physical computing device comprises at least one physical processor adapted to execute a management facility of the virtual machine environment to enable power-saving techniques for the at least one virtual machine by intercepting, with the management facility, a query from the operating system, the query seeking whether hardware executing the operating system supports an idle state, and informing the operating system that the at least one virtual processor does support the idle state when a physical processor of the at least one physical computing device does not support the idle state.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
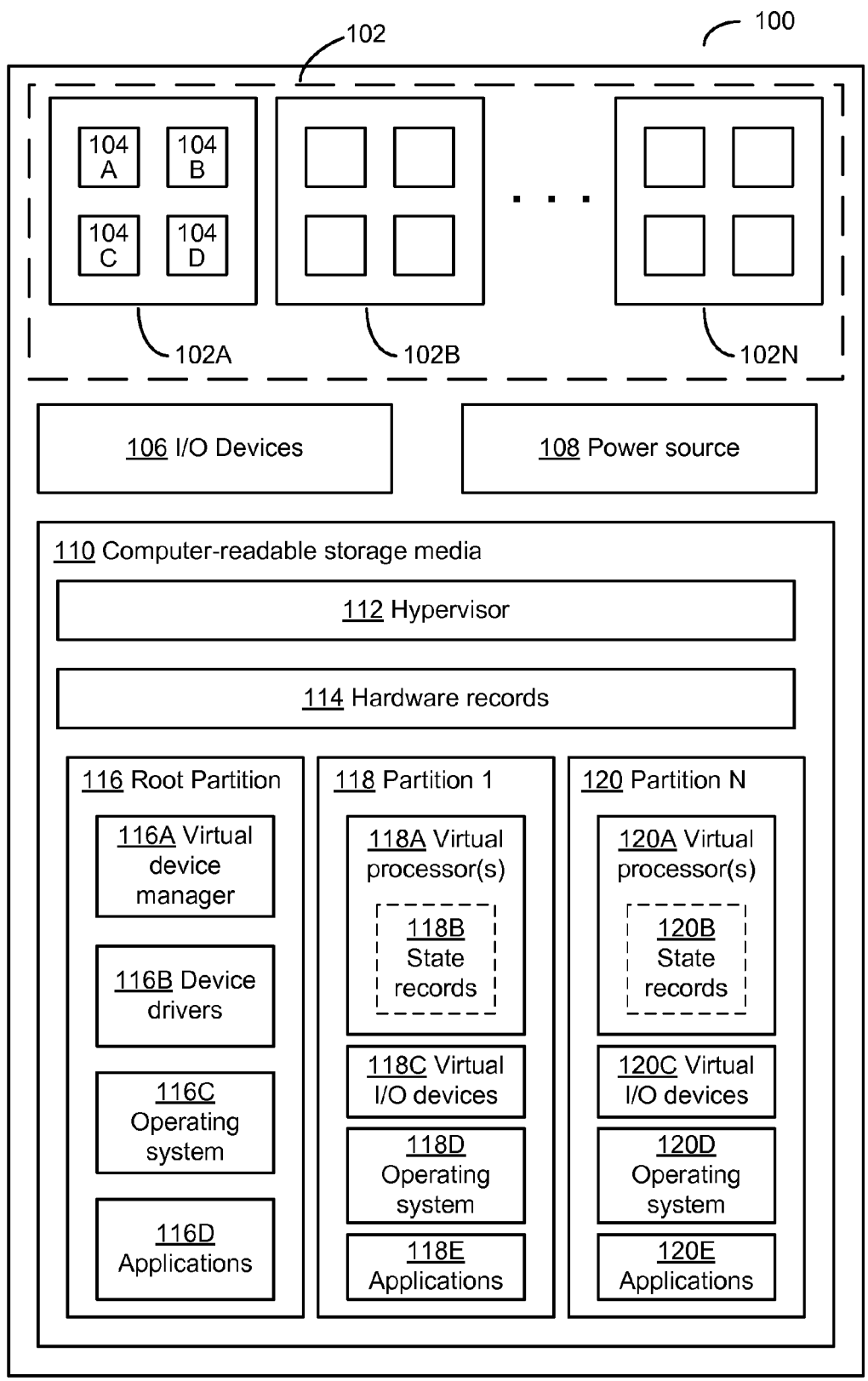
FIG. 1 is a block diagram of an exemplary computer system in which some implementations of the techniques described herein may act.

Power-saving techniques have conventionally focused on enabling physical devices to reduce power consumption through, for example, placing themselves into idle, low-power states. However, Applicants have recognized and appreciated that real power savings may be achieved by implementing power savings behavior on virtual processors.

As is known in the art, some computing devices execute software that creates a virtual machine environment. The virtual machine environment contains one or more virtual machines. A virtual machine is a software abstraction of a computer system that allows a guest operating system to be executed by a management facility of the virtual machine environment as one or more processes of a host operating system of the computing device. A virtual machine may have virtual hardware, such as virtual input/output devices and virtual processors, with which the guest operating system may interact, and may support execution of various software applications and other modules/facilities.

As a software abstraction of a computer system, without any physical, power-consuming components of their own, no development of power-saving techniques for virtual machines has been conventionally done. However, Applicants have recognized and appreciated that through making virtual machines power-aware and enabling them to make power decisions on behalf of their virtual hardware (e.g., virtual processors), increased power saving—and decreased power consumption—can be achieved on the physical computer systems on which a virtual machine is executing.

Management facilities of virtual machine environments—the software that maintains and manages the virtual machine(s) of the virtual machine environment—attempt to increase the efficiency of virtual machines by distributing the processing burden of the virtual machine throughout the physical computer system. For example, if the physical computer system includes a physical computing device having multiple physical processor chips and/or multiple processor cores per chip, and the virtual machine has multiple virtual processors, then the management facility may execute functions for each individual virtual processor on different physical processors. This may be done because when a particular physical processor is interacting with a component of the physical computer system, that physical processor may have a lock on interaction (e.g., a mutually exclusive lock) with that component to prevent other components of the computer system from interacting with that component. Many of these locks may be unique to each processor, and accordingly when a virtual machine is executing a set of functions on two or more virtual processors, the management facility may attempt to alleviate or eliminate the delays and inefficiencies caused by these locks by spreading execution of the functions of the virtual processors between many different physical processors.

Applicants have additionally recognized and appreciated that conventional power-saving techniques are typically enabled when a physical processor is detected to have no processing burden. For example, when a processor is not executing any functions, that processor may be placed into an idle state to save power. However, Applicants have recognized that when a management facility of the virtual machine environment is distributing a processing burden for virtual machines between many different processors, there may be little chance that a physical processor will have no processing burden and little chance that the physical processor will be able to be placed in the idle state. Accordingly, there is little chance that power consumption will be reduced for the physical computer system.

Applicants have recognized that it is advantageous to allow the management facility to distribute processing burden of a virtual machine between different physical processors, but have further recognized and appreciated that it may be possible to reduce a processing burden on the physical processors by enabling virtual machines to carry out power-saving techniques for virtual processors. For example, if a virtual machine is enabled to detect that a virtual processor may be placed into an idle state and does place the virtual processor into the idle state, then a processing burden on the physical processor may be reduced and it may be more likely that a processor may be placed into an idle state to save power.

In view of the foregoing, described herein are various principles for enabling a guest operating system of a virtual machine to carry out power-saving techniques for the virtual machine. In some implementations, a management facility may be adapted to inform a guest operating system executing on a virtual machine that the virtual processor(s) of the virtual machine support power-saving techniques. For example, the management facility may inform the guest operating system that the virtual processor supports an idle state, including an idle state from which the processor may be woken by arrival of an interrupt request even when interrupts are masked. In some embodiments, the idle state may be the C2 state or "stop clock" state as defined for the Advanced Configuration and Power Interface (ACPI) standard.

Techniques operating in accordance with these principles enable a guest operating system to place a virtual processor into an idle state. The idle state may include masking some interrupts for the virtual processor—such as the clock. This enables the virtual processor to remain in the idle state longer. Allowing the virtual processor to remain in the idle state longer may enable increased power-saving through reducing a processing burden on a hardware processor. The processing burden may even be reduced to a point where the hardware processor can be placed into an idle state that may save power. Further, these techniques may increase performance of a virtual machine environment by allowing the environment to schedule processing time on hardware processors for only those virtual processors that will be performing processing; this leaves more processing resources available for virtual processors that will be performing processing, which can speed up execution of tasks by these virtual processors.

Enabling power-saving techniques for virtual processors may enable guest operating systems of virtual machines to use specific power-saving technologies, such as Intelligent Timer Tick Distribution (ITTD). In ITTD, sometimes called "tick skipping," a guest operating system is configured to maintain accurate time information even though it does not respond to periodic timer interrupts while the processor on which it is executing is in an idle state so that the processor does not wake for each tick of the timer. The processor does wake from the idle state, however, upon receipt of an interrupt request calling for the execution of some other function. When the physical processor receives such an interrupt request, the processor may first perform initialization tasks, such as updating its time records, before performing the function requested by the interrupt. In this way, a processor may remain in the idle state longer, leading to decreased power consumption and increased power saving. In some embodiments of the invention, ITTD may be enabled for virtual processors, and the management facilities of the virtual machine environment may inform the guest operating system that ITTD is supported.

However the information identifying the ability of the virtual processor to be placed into the idle state is passed, this information may enable the guest operating system to place the virtual processor into an idle state in any suitable manner. Enabling these techniques may allow an operating system that was designed to run on a physical processor that supports such idle states to also invoke the idle state when running as a guest operating system on a virtual processor.

Various exemplary implementations of these techniques are described below. In some of these examples, a virtual processor is not woken from an idle state upon arrival of a clock interrupt signal. It should be appreciated, however, that the clock interrupt signal is only one example of the types of interrupt signals that may be masked/disabled when the virtual processor is in the idle state, and that other interrupt signals may be masked/disabled.

Techniques operating in accordance with the principles described herein can be implemented in any suitable computer system comprising any suitable number and type(s) of computing devices of any suitable type. Each of these computing devices may be individually executing a virtual machine environment, or may be sharing in the execution of a virtual machine environment. Some examples below, such as that shown in FIG. 1, describe one exemplary implementation of these principles, which may act in a computer system having a single computing device executing a virtual machine environment supporting one, two, or more virtual machines and executing management facilities for the virtual machine environment. It should be appreciated, however, that this implementation and this system are only illustrative of the various embodiments of the principles described herein. Other implementations may operate in any other suitable computer system, such as those comprising multiple computing devices sharing a processing burden associated with a virtual machine environment.

The computer system of FIG. 1 comprises a computing device 100, which may be any suitable device that may support a virtual machine environment. For example, computing device 100 may be a desktop and/or laptop personal computer, or a server or mainframe computer, but may also be a personal digital assistant (PDA), smart mobile phone, or any other device. As described in greater detail below, a virtual machine environment may be implemented as a set of one or more facilities that enable execution of a virtual machine as one or more processes on the computing device 100. These processes may be executed in any suitable manner on the computing device 100. In the embodiment shown in FIG. 1, these processes may be executed on microprocessors.

Computing device 100 comprises one or more processor chips 102A, 102B, . . . , 102N (which are collectively referred to herein as processor 102). Processor chip 102 may be any suitable microprocessor that can be adapted to carry out functions related to a virtual machine environment, as it should be appreciated that embodiments of the invention are not limited to executing on or with any particular number or type of processors.

As shown in FIG. 1, in some implementations processor chip 102 may be a multi-core processor chip, comprising one or more physical and/or logical processor cores 104, such as processor cores 104A, 104B, 104C, and 104D. A processor core 104 of processor chip 102 may be a portion of processor chip 102 able to perform functions separately from other processor cores 104 of processor chip 102, and may be able to perform them in parallel with other cores 104. Processor cores 104 may, in some implementations, share some resources within processor chip 102 and/or may be adapted to communicate with one another and pass information, though it should be appreciated that in embodiments of the invention that use multi-core processors, such processors may be implemented according to any suitable multi-core architecture as embodiments of the invention are not limited in this manner.

For ease of description, references to processor chips 102A, . . . , 102N, as well as processor cores 104A, . . . , 104D, may be consolidated below to a reference to a processor, such as a processor 102. Accordingly, below, where reference is made to a processor—such as functions executing on processor, or placing a processor into an idle state—it should be understood to refer to one of processor chips 102A, . . . , 102N and/or a processor core 104A, . . . , 104D of a processor chip 102, unless otherwise specified.

Computing device 100 further comprises input/output (I/O) devices 106, which may be any suitable hardware and/or software for transmitting information from or receiving information at computing device 100. For example, I/O devices 106 may include one or more network adapters for transmitting and/or receiving information on a computer network, and/or user interface devices such as a keyboard, mouse, and display for transmitting and/or receiving user interface information. I/O devices 106 may be a part of computing device 100, or may be peripheral devices with which computing device 100 may communicate. Any suitable devices for transmitting and/or receiving information may be implemented as I/O devices 106, as embodiments of the invention are not limited in this respect.

Computing device 100 may further comprise a power source 108, which may provide power to all hardware elements of computing device 100. Power source 108 may be any suitable power source, including a battery and/or circuitry to connect to and manage input from an external power source, such as an A.C. power source.

As shown in FIG. 1, computing device 100 may also comprise computer-readable storage media 110, that may store information (e.g., data and/or instructions) relating to a virtual machine environment. The information stored on computer-readable storage media 110 may include computer-executable instructions that, when executed by a physical processor, provide management facilities adapted to control and regulate operation of the virtual machine environment, including controlling and regulating operation of virtual machines executing in that environment. For example, because the virtual machine is only a software abstraction of a computer system, if the virtual machine is to perform a function or task, then that function or task must be performed by the computing device 100. The management facilities may therefore control and regulate operations of the virtual machine to allow those functions to be carried out on the processor 102 when requested by the virtual machine. As another example, the management facilities may be adapted to regulate interactions between components of the physical computer system (e.g., I/O devices 106) and a virtual machine, such as by intercepting and handling function calls between them. Management facilities may be implemented in any suitable manner, as embodiments of the invention are not limited to operating with any particular virtual machine environment.

In some embodiments of the invention, the management facilities of a virtual machine environment may comprise a hypervisor 112. The hypervisor 112 may be adapted to monitor and direct execution of functions of the one more virtual machines executing in the virtual machine environment. This monitoring and direction may be carried out in any suitable way, including by emulating the operations of one or more physical processors in such a way to expose virtual processors to the virtual machines. In the course of emulating, the hypervisor 112 may interact with the guest operating system in the same way that the physical processor being emulated would. As described above, monitoring and directing execution of these functions may comprise executing functions on behalf of the virtual machines (e.g., on behalf of the guest operating systems of the virtual machines) by directing processor 102 to carry out one or more functions. In cases where the virtual processor of the virtual machine is a different type of processor than the physical processor of the computing device 100, then the hypervisor 112 may also perform translation to convert that function into one that may be executed by the physical processor 102. Accordingly, while virtual machines and virtual processors are frequently characterized as "executing" functions, it should be understood that the hypervisor 112 monitors the virtual machine to detect when a function is to be executed, then causes the physical processor 102 to carry out that function.

Hypervisor 112 may also provide information to the virtual machines upon request. For example, the hypervisor 112 may detect query operations carried out by virtual machines that seek information on the "hardware" of the virtual machines—that is, information on the virtual hardware and virtual devices of the virtual machines—and provide responses to those query operations. This information may be any suitable information that may be requested and used by a virtual machine, such as information on properties and capabilities of the virtual hardware. In some cases, the hypervisor 112 may review and process information in hardware records 114 associated with the hardware of the computing device 100 (i.e., information on the properties and capabilities of the physical hardware of computing device 100) in detecting and responding to these queries. Hardware records 114 may include any suitable information on the computing device 100, such as ACPI tables, usage statistics, and other information. Examples of information that may be used by the hypervisor 112 and/or supplied to a virtual machine, and the operations of the hypervisor 112 performed in response to requests from a virtual machine for information, are described in greater detail below.

In some implementations of the invention, the management facilities of the virtual machine environment may be implemented as the hypervisor 112, while in other embodiments of the invention some functionality of the management facilities may be implemented in both the hypervisor 112 and a root partition 116. Such an implementation may be used, for example, where the virtual machine environment is implemented as in the Hyper-V Server 2008 virtual machine environment available from the Microsoft Corporation of Redmond, Wash. In such an environment, the root partition 116 and the hypervisor 112 may divide responsibility for functionality of the management facilities in any suitable manner. In some implementations, the hypervisor 112 may be responsible for monitoring and directing the virtual machines, while the root partition 116 may be responsible for controlling use of and access to hardware of the computing device 100 (e.g., I/O devices 106). In some cases, the root partition 116 may be treated as a virtual machine by the hypervisor 112 and may interact with the hypervisor similar to other virtual machines, albeit one that is aware that it is interacting with the hypervisor 112.

The root partition 116 may include an operating system 116C for the computing device 100 and may carry out some or all of the functions traditionally performed by operating systems of computing devices, including regulating access to the physical hardware of the computing device. For example, the root partition 116 may make use of device drivers 116B to govern interactions with the hardware of the computing device 100, such as the I/O device 106, and may control and direct operations of processes executing on the computing device 100 to prevent errors in those processes. These processes may be associated with one or more software applications 116D as well as those associated with virtual machines of the virtual machine environment. To control interactions between virtual machines and the hardware of computing device 100, the root partition 116 may implement a virtual device manager 116A to expose and manage virtual hardware of each of the virtual machines of the virtual machine environment. For example, where computing device 100 includes the processor 102, the root partition 116 may expose, through the virtual device manager 116A, one or more virtual processors to the virtual machines. Similarly, the virtual device manager 116A may expose virtual equivalents of some or all of the I/O devices 106 to each of the virtual machines, for use by the virtual machines. When a virtual machine uses the virtual hardware, the virtual device manager 116A of the root partition 116 may intercept functions and instructions associated with that use, and root partition 116 and device drivers 116B may carry out those instructions using the hardware of computing device 100. The root partition 116 may then return any response or result from the hardware to the virtual machine that requested the function/instruction.

The virtual machine environment of computing device 100, managed by management facilities that may include hypervisor 112 and/or root partition 116, may support any number of virtual machines that support any type of functionality. As described above, a virtual machine is a software abstraction of a computer system, such as a software abstraction of a computing device like computing device 100. Each virtual machine may have virtual hardware, which may include virtual hardware managed by the virtual device manager 116A of root partition 116. Each virtual machine may also execute an operating system—known as a "guest" operating system, to distinguish it from the "host" operating system 116C of the computing device 100—to carry out functions traditionally performed by operating systems of computing devices. For example, the guest operating system may govern interactions with the virtual hardware of the virtual machine, and may control and direct operations of processes executing on the virtual machine. These processes may be associated with one or more software applications that are installed on the guest operating system. When a software application is executed on the virtual machine, it may be instantiated as one or more processes of the guest operating system to be executed on the virtual processor. As described above, however, it should be appreciated that this process may be detected by the management facilities of the virtual machine environment, and executed on processor 102 of the computing device 100.

Typically, virtual machines support the same operating systems as physical computing devices, such that there is no distinction between the functionality of a typical operating system of a physical device and a guest operating system of a virtual machine. Indeed, in many cases a guest operating system may be installed on a virtual machine and executed without the guest operating system being aware that it is only executing on a virtual machine; the guest operating system may interact with the virtual hardware as if it is regular, physical hardware and the management facilities of the virtual machine environment may enable that by causing the virtual hardware to respond to the guest operating system as would physical hardware. In other cases, however, a guest operating system may be informed by the management facilities, or may be adapted to detect, that it is executing on a virtual machine. In that case, the guest operating system may be adapted to perform different functions, or perform functions differently, to interact directly with the management facilities of the virtual machine environment (e.g., the hypervisor 112 and/or root partition 116) to carry out some tasks. These specific functions that enable the guest operating system to communicate directly with the management facilities may enable greater efficiency in the operations of virtual machines, as more information may be passed between the management facilities and guest operating system that would be normally passed during emulation of the operations of a typical, physical computing device.

The virtual machine of each partition, and the components of each partition (e.g., the virtual hardware), may be implemented in any suitable manner, such as according to any known techniques for implementing virtual machines and virtual machine environments. For example, each virtual machine and each component may be implemented as a set of data structures and/or instructions that may be used/executed by the management facilities to emulate operations of hardware that is virtualized by the virtual machine/components.

FIG. 1 shows two partitions, partition 1 118 and partition N 120, each of which may execute a virtual machine. Each partition comprises the virtual hardware of the virtual machine, such as one or more virtual processor(s) 118A, 120A, and I/O devices 118C, 120C, as well as any other suitable virtual hardware. Each partition may also include a guest operating system 118D, 120D, that may be responsible for managing and directing execution of the virtual machine, and which may run processes for one or more software applications 118E, 120E.

The virtual processor(s) 118A, 120A may be responsible for executing functions requested by the respective virtual machines. As discussed above, the management facilities of the virtual machine environment may monitor and direct execution of the virtual machine by, for example, detecting when the guest operating system assigns a task for execution to a virtual processor, and executing that function on a physical processor 102. In some implementations, each virtual processor of a virtual machine may be assigned to a different processor 102 and/or core 104, to distribute a burden associated with processing for the virtual machine.

Virtual processor(s) 118A, 120A may make available to the virtual machines records regarding their status in the form of state records 118B, 120B. State records may include any suitable information about the state of the virtual processors, including information on the properties and/or capabilities of the virtual processors as well as information on the current status of the virtual processors, such as usage statistics. This information may be stored by the virtual processors or may be determined and provided by the hypervisor 112 upon request by the virtual machine, as discussed below.

Virtual I/O devices 118C, 120C may be software abstractions of any suitable hardware that may be used by a physical computer system. For example, virtual I/O devices 118C, 120C may be virtual equivalents of some or all of I/O devices 106 of computing device 100. Virtual I/O devices 118C, 120C may include virtual network adapters, virtual displays, virtual disk drives, and other virtual hardware. Where a virtual I/O device is an abstraction of a hardware I/O device 106, the management facilities of the virtual machine environment (e.g., the virtual device manager 116A) may detect interactions with the virtual I/O device and perform one or more functions related to that interaction on the hardware I/O device 106. For example, when a virtual processor of a virtual machine carries out a function that requires access to and interaction with a component of the virtual I/O devices, the management facilities may cause the physical processor 102 to carry out a similar interaction with hardware I/O devices 106, and may emulate that operation to the virtual machine. As an example, if the virtual processor attempts to send or receive information over a virtual network adapter, the management facilities may detect that send/receive operation to be carried out by the virtual processor and virtual network adapter. The management facilities may then cause it to be carried out on the physical processor and hardware network adapter, and may then provide to the virtual machine any output of the hardware network adapter related to the function requested by the virtual machine.

The interactions and functions of a virtual machine that are detected and executed by the management facilities may be any suitable interactions or functions. As described above, in some embodiments of the invention, a virtual machine environment may be adapted to permit a guest operating system of a virtual machine to carry out various power management techniques. In some cases, a guest operating system may be functioning as if the virtual machine were a physical machine and without knowledge that the virtual machine is not a physical computing device, such that these power management techniques are the same techniques that may be used by the operating system in other environments. In other cases, however, a guest operating system may be aware that it is executing on a virtual machine, and may carry out specific power management techniques for a virtual machine environment or may carry out power management techniques in a specific way. These power management techniques that are implemented by guest operating systems of virtual machines may comprise any suitable technique(s) for saving power, including placing virtual processors of the virtual machine into an idle state.

As discussed above, enabling a guest operating system to carry out power management techniques—for example, by permitting the guest operating system to place a virtual processor into an idle state—real power savings may be seen on underlying hardware. For example, if management facilities of a virtual machine environment are scheduling functions for each virtual processor of each virtual machine on a different processor 102 and/or core 104, then each of these processors/ cores may be executing functions for the virtual machines and will not be able to be put into an idle state to save power. If, however, some of the virtual processors were placed into an idle state, and the load on the physical processors were reduced, then it may be the case that some of the processors 102 can be placed into an idle state (e.g., the processors 102 that correspond to those virtual processors). When the processors 102 are placed into the idle state, then power may be saved.

Accordingly, a virtual machine environment may be adapted to carry out techniques for enabling a guest operating system to place a virtual processor into an idle state. This enabling may be done by informing the guest operating system that the virtual processor supports an idle state, such that the guest operating system may use power management techniques to determine whether and when to place the virtual processor into the idle state. The management facilities may enable the power management techniques in any suitable manner, including according to exemplary techniques discussed below. However, it should be appreciated that these techniques are merely illustrative of the types of techniques that may be implemented, as embodiments of the invention are not limited to implementing these power management techniques for virtual machines in any particular manner.

Figure 2:
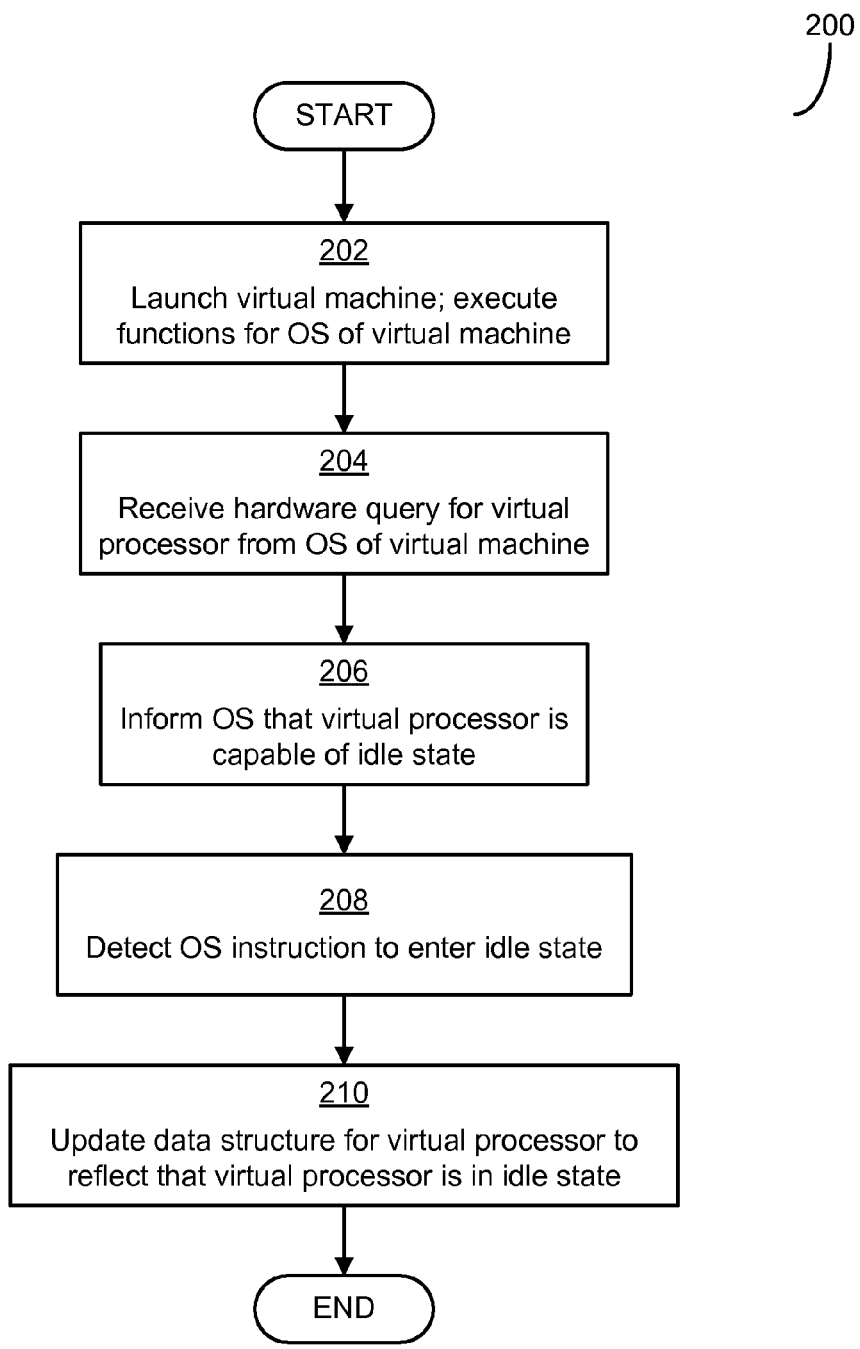
FIG. 2 is a flowchart of one exemplary process for placing a virtual processor of a virtual machine into an idle state.

FIG. 2 shows one exemplary process 200 for placing a virtual processor of a virtual machine into an idle state. Process 200 begins in block 202, in which management facilities of a virtual machine environment launch a virtual machine and execute functions on behalf of the virtual machine (e.g., execute operating system tasks and/or application programs).

In block 204, the management facilities receive a query from the guest operating system of the virtual machine, the query being related to the capabilities and/or properties of the virtual "hardware" of the virtual machine, and in block 206 the management facilities may respond indicating that the virtual processor supports an idle state.

This query of block 204 may be received by the management facilities in any suitable manner, and may be dependent on how the management facilities and/or guest operating system are implemented. For example, in some implementations, the query of block 204 may be made in the form of a conventional Advanced Configuration and Power Interface (ACPI) query from the guest operating system, seeking information stored in virtual processors' ACPI tables. Such an implementation may be used where the guest operating system is not aware that it is executing on a virtual machine, and is seeking the information typically stored in records maintained by physical processors. When the guest operating system issues the ACPI query, the management facilities of the virtual machine environment (e.g., the hypervisor) may detect the query, process the query to form a response, and transmit in block 206 the response to the guest operating system that may be formatted in such a manner so as to appear that it originated from a hardware processor that the virtual processor is emulating. The response may state that the virtual processor supports an idle state, such as the ACPI C1 and C2 idle states. In some embodiments of the invention, the response may indicate support by the virtual processor for the C1 and C2 idle states when the underlying hardware of a computing device on which the virtual machine environment is executing (e.g., processor 102 of FIG. 1) does not support the C1 and C2 idle states.

In other implementations, rather than forming and transmitting a response in block 206, the management facilities may store ACPI data, in a location accessible to the guest operating system, that indicates support for an idle state. In this way, the query of block 204 and the response of block 206 may be implemented as a read operation on a particular memory location. This memory location may be directly accessible by the guest operating system, such that the information may be provided directly with little intervention by the management facilities, or the management facilities might be adapted to recognize that memory address as corresponding to a particular other location in memory, and may provide the data from that other location in response to the read operation. In this way, rather than forming a response as in the example above, a response may be provided directly from memory.

A virtual machine environment may not be constrained in all cases to emulating or duplicating functionality of a physical computer system, however. Accordingly, embodiments of the invention are not limited to receiving ACPI queries or providing ACPI data. In some cases, a guest operating system may be aware that it is executing in a virtual machine and may carry out specific, different functions using that knowledge to interact directly with the management facilities for this information rather than with the virtual hardware. For example, in embodiments of the invention that implement a root partition as part of management facilities of the virtual machine environment (e.g., root partition 116 of FIG. 1), the operating system of the root partition may be aware that it is executing as a virtual machine and may carry out such specific functions. Other operating systems may be adapted to query for whether they are executing on a virtual machine, or may be adapted to detect that they are executing on a virtual machine, and then may carry out these types of specific, different functions to interact with the management facilities of the virtual machine environment.

These specific, different power management tasks may be implemented by such "enlightened" operating systems (i.e., operating systems aware that they are executing in a virtual machine) in any suitable manner. For example, in some implementations the query of block 204 may be a query submitted directly to the management facilities of the virtual machine environment, such as a query submitted via an Application Programming Interface (APT), rather than an indirect query associated with the virtual processor. Carrying out power management tasks in this specific manner—communicating directly with the management facilities of the virtual machine environment—may enable passing more information, or more specific information, more efficiently than passing information through indirect, traditional machine emulation paths (e.g., the ACPI queries described above). One such API call may be an APT call associated with central processing unit identification (CPUID) information identifying the properties and capabilities of the virtual processor. The CPUID information may be maintained by the management facilities, and may be provided to the guest operating system in block 206 as a response to the query of block 204. The CPUID may indicate support for idle states, such as the ACPI C1 and C2 states. As above, in some embodiments of the invention, information provided to the guest operating system of the virtual machine (in any way) may indicate support by the virtual processor for an idle state when the underlying hardware of a computing device on which the virtual machine environment is executing (e.g., processor 102 of FIG. 1) does not support the idle state.

Further, in some implementations, rather than a query for whether a virtual processor supports an idle state, a guest operating system may query for whether the virtual processor supports one or more technologies that make use of the idle state. For example, Intelligent Timer Tick Distribution (ITTD) is a technology that enables a system to refrain from waking a processor to process timer ticks (i.e., a clock signal). Such technology relies on the processor supporting an idle state, such as the ACPI C2 state. Accordingly, in some embodiments of the invention, rather than querying for whether the virtual processor supports an idle state, the guest operating system may query in block 204 for whether the virtual processor supports ITTD or any other technology.

It should be appreciated that these examples of ways to exchange information regarding the properties and capabilities of the virtual processor in block 204 and 206 are merely illustrative of the ways in which information could be passed, and that embodiments of the invention is not limited to implementing any particular technique for passing information.

In block 208—after informing the guest operating system in block 206 that the virtual processor supports an idle state—the management facilities of the virtual machine environment may detect an instruction by the guest operating system for the virtual processor to enter the idle state. This instruction may be implemented in any suitable manner, and may be detected by the management facilities in any suitable manner. This instruction may be a conventional power management function carried out by the guest operating system and directed to the virtual processor. For example, the guest operating system may carry out conventional power management techniques to detect a load on the virtual processor, and if it detects that the load is such that the virtual processor may be temporarily placed into an idle state, the guest operating system may place the virtual processor into the idle state by issuing a suitable instruction. This instruction may, in some cases, be a write or read operation associated with registers of the virtual processor. For example, in some implementations the instruction may be implemented by the guest operating system as a read operation for a machine state register (MSR) associated with the state of the virtual processor. The MSR may be one associated with the idle state, and performing a read operation on the MSR may be an instruction to enter the idle state. The instruction may be implemented as a read operation in this way to enable returning information to the guest operating system on the state of the virtual processor. For example, the guest operating system may be informed, in response to the MSR read operation, that the virtual processor was placed in the idle state. It should be appreciated, however, that embodiments of the invention are not limited to returning any information, or any particular type of information, when the instruction is implemented as a read operation. In other implementations, rather than a read operation, the instruction of block 208 may be implemented as a write operation, or as a function interacting with records of the virtual processor (e.g., writing information to a data structure, such as an MSR) or issuing ACPI function calls according to the ACPI standard. Further, the instruction may, for "enlightened" operating systems, include interacting directly with the management facilities (e.g., as an API call to the hypervisor). The instruction may be carried out in any suitable manner.

In block 210, in response to detecting the instruction of block 208 by the guest operating system to place the virtual processor into the idle state, the management facilities may carry out one or more tasks to place the virtual processor into the idle state. As described above, the management facilities may, upon detecting functions and tasks that are to be carried out by the virtual processor for the guest operating system, carry out related tasks on a physical processor to emulate these functions/tasks. The management facilities may carry out any suitable actions, including, for example, updating data structures maintained by the virtual machine environment that are associated with the virtual processor so that no cycles of the physical processor are scheduled for use by the virtual processor. Because a virtual machine is a software abstraction of a computer system, in some embodiments of the invention, a virtual machine may be implemented by a virtual machine environment as a series of data structures identifying the components and functions of the virtual machine that should be emulated by the virtual machine environment, including virtual processors. These data structures may then be used to regulate and direct operation of the physical computer system, such as in scheduling time sharing of a physical processor or other hardware between the virtual machines of the virtual machine environment. For example, when scheduling is taking place for time sharing of a physical processor, the management facilities may report which virtual processors are awake and need processing time, and may further report how much processing time they need (e.g., based on how many functions the virtual processor has been instructed to execute). If a data structure for a virtual processor indicates that the virtual processor is in the idle state, then the management facility will not report that the virtual processor needs processing time.

Accordingly, when a virtual processor is put into an idle state, one or more data structures associated with the virtual processor and/or the virtual machine may be updated to reflect that the virtual processor is in the idle state. These data structures may then be used by the management facilities and/or other components of the virtual machine environment to affect operations of the virtual machine environment and/or operations of one or more computing devices on which the virtual machine environment is executing. For example, the virtual machine environment may make decisions regarding how (or whether) to interact with the virtual processor depending on whether the virtual processor is in the idle state and the information contained within the data structures relating to the virtual processor. Further, the operating system of the computing device (the host operating system) may make decisions regarding which of its processors (i.e., processor chips 102 and/or processor cores 104) may be placed into an idle state based on which or how many virtual processors are being maintained by the virtual machine environment at a given time, as well as any other characteristics of the processing load placed on the processors. For example, if all of the virtual processors associated with a particular physical processor are in an idle state, then the physical processor may have a reduced or zero load and may be placed into the idle state.

Once the virtual processor is in the idle state, the process 200 ends.

Once a virtual processor is in an idle state, a virtual machine environment may take any suitable actions to interact (or not interact) with the virtual processor and/or virtual machine. These actions may include refraining from signaling the virtual processor, and waking the virtual processor from an idle state.

In embodiments of the invention, a virtual processor may be placed by a guest operating system into the idle state until the virtual processor is needed again to execute functions on behalf of the virtual machine and/or guest operating system. Determining when the virtual processor is to be woken from the idle state may be done in any suitable manner. In some embodiments of the invention, the virtual processor may be woken from the idle state upon receipt of an interrupt request for the virtual processor. An interrupt for a processor is a specialized signal that is transmitted to a processor from another component of a computing device instructing the processor to carry out some function. For example, a network adapter may transmit an interrupt request to a processor along with data that had been received over the network, requesting that the processor stop what it is doing (i.e., "interrupt" its current execution) and perform some function with the data (e.g., store the data in memory). A virtual processor may also be adapted to handle interrupt requests from components of the virtual machine, such as from the guest operating system and/or virtual hardware such as virtual I/O devices or other virtual processors.

The virtual machine environment may be adapted to wake a virtual processor from the idle state upon arrival of interrupt requests for the virtual processor, to ensure that functionality of the virtual machine is not disrupted when a virtual processor is placed in the idle state. Accordingly, the management facilities or other components of the virtual machine environment may monitor signals transmitted to a virtual processor in the idle state and determine whether the virtual processor is to be woken from the idle state to process those signals.

This may be done in any suitable manner, as embodiments of the invention are not limited to implementing a virtual machine environment in any particular manner. Signals may be monitored and discarded or processed in any suitable way, and a determination of whether a virtual processor is to be woken may be carried out according to any suitable technique.

Figure 3:
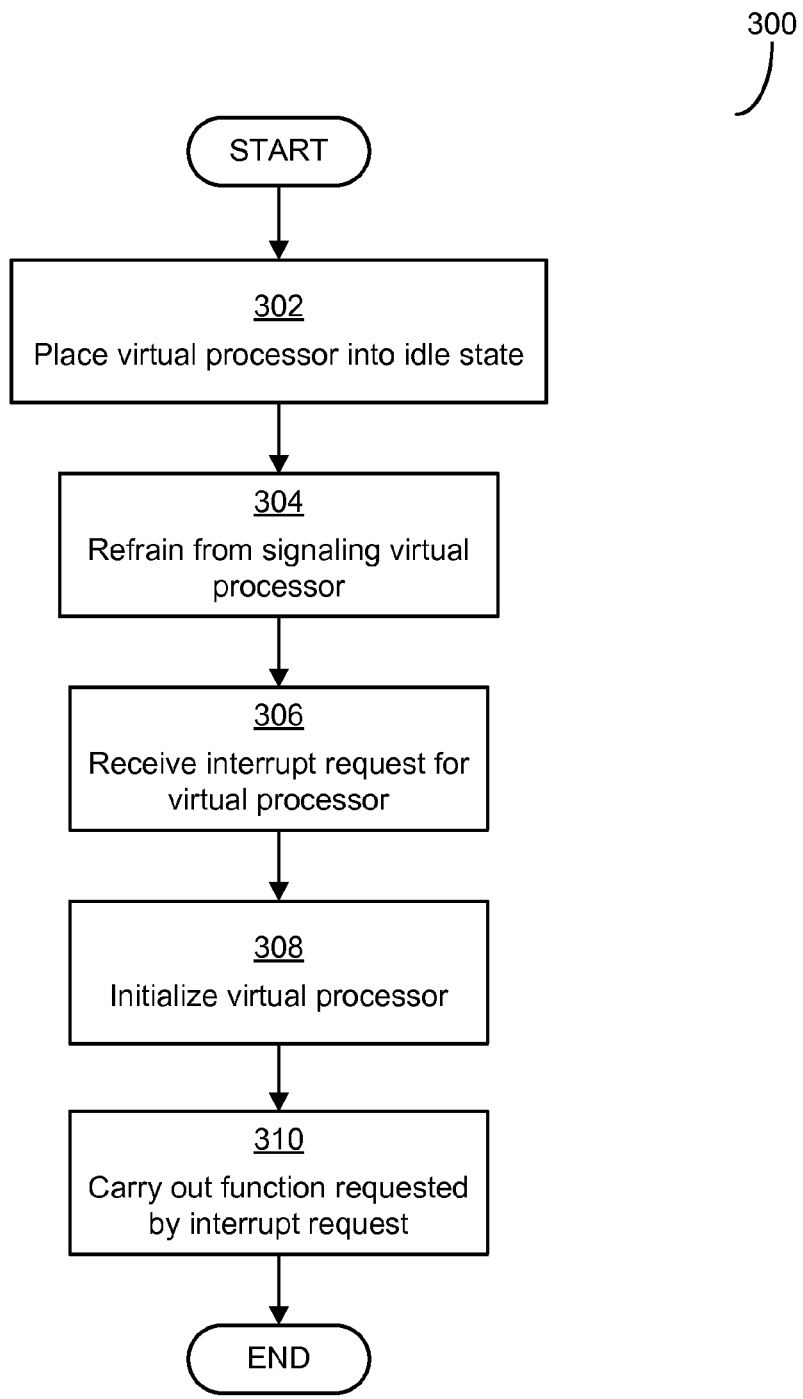
FIG. 3 is a flowchart of an exemplary process for waking a virtual processor from an idle state to perform processing related to a received interrupt.

FIG. 3 shows one exemplary process 300 that may be followed by management facilities of the virtual machine environment for waking a virtual processor from an idle state. It should be appreciated, however, that the process 300 is only illustrative of processes that may be implemented to wake a virtual processor, and that others are possible.

Process 300 begins in block 302, in which a virtual processor is placed into an idle state. This may be done for any suitable reason, and in any suitable manner, including according to any of the techniques described above in connection with process 200 of FIG. 2.

In block 304, once the virtual processor is placed into the idle state, the management facilities (e.g., hypervisor) of the virtual machine environment may refrain in block 304 from signaling the virtual processor. Refraining in block 304 may be carried out in any suitable manner, such as by refraining from performing functions of the virtual machine environment on the virtual processor. Functions of the virtual machine environment may include various emulation functions that may be carried out by the virtual machine environment, including emulating low-level functions of computer hardware such as a clock signal. When a virtual processor is not in an idle state, the virtual machine (e.g., the guest operating system) may update time records of the virtual processor periodically. When the virtual processor is in the idle state, however, the virtual machine environment may refrain from updating the time records, because doing so would require the virtual processor to be woken from the idle state. To enable greater power savings through leaving the virtual processor in an idle state longer, the virtual machine environment may therefore refrain from signaling the virtual processor based on what the signals are. Accordingly, in block 304 the virtual machine environment may receive and analyze signals intended for the virtual processor, and refrain from signaling the virtual processor or performing one or more functions on them on behalf of the virtual processor.

In block 306, however, when the virtual machine environment intercepts and identifies a signal intended for the virtual processor that includes an interrupt request, then the virtual machine environment may wake the virtual processor from the idle state to perform processing relating to the interrupt request and the function requested in the interrupt request. It should be appreciated that "waking" the virtual processor from the idle state may be done in any suitable manner, such as by updating one or more data structures associated with the virtual machine environment and/or virtual processor to indicate that the virtual processor is not in the idle state and is ready to perform processing.

In some embodiments of the invention, waking the virtual processor may involve performing one or more initialization actions for the virtual processor in block 308. In some cases, because the virtual processor was in the idle state and the virtual machine refrained in block 304 from signaling the virtual processor in response to some signals, the virtual processor should be updated according to some or all of those signals. For example, if the virtual processor was not signaled with a clock signal while in the idle state, then the virtual processor may have its time records updated to reflect a current time when it is awoken from the idle state. This may be done to ensure synchronicity with other components of the virtual machine and to ensure smooth operation of the virtual machine and communications between components of the virtual machine. Other records and data structures of the virtual processor may be similarly updated during the initialization of block 308, according to what signals were received and not processed by the virtual processor in block 304.

In some embodiments of the invention, placing a virtual processor into the idle state in block 302 may comprise masking interrupts for the virtual processor, such that the virtual processor does not receive and process any interrupts while in the idle state (e.g., clock signal interrupts). Upon detecting that an interrupt request for performance of a function has been received in block 306, however the management facilities of the virtual machine environment may hold the interrupt and begin the process of waking and initializing the virtual processor. In such embodiments, one step of the initialization process of block 308 is the re-enabling of interrupts, then, such that future interrupts may be received by the virtual processor once it has awoken from the idle state.

In some implementations, during the initialization of block 308, the virtual machine environment may not inform other components of the virtual machine environment and/or the virtual machine of the virtual processor that it is no longer in the idle state, This may be done to ensure that no tasks or functions are assigned to the virtual processor until it is fully initialized.

In block 310, once the virtual processor has been initialized in block 308, then the virtual processor may be enabled and made available to other components of the virtual machine, and may carry out the function requested in the interrupt request received in block 306. In embodiments of the invention where placing the virtual processor into the idle state comprises masking interrupts, as discussed above, the function requested by the interrupt may be processed in block 310 upon re-enabling of interrupts.

Once the virtual processor has been woken from the idle state and is performing processing for the virtual machine (e.g., performing processing related to the interrupt request), the process 300 ends.

Techniques operating according to the principles described herein may be implemented in any suitable manner. Included in the discussion above are a series of flow charts showing the steps and acts of various processes that enable power management techniques to be employed by guest operating systems of virtual machines executing in a virtual machine environment. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as Application-Specific Integrated Circuits (ASICs) to carry out virtual machine techniques, or may be implemented in any other suitable manner. It should be appreciated that the flow charts included herein do not depict the syntax or operation of any particular circuit, or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein without departing from the invention.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package, for example as a software program application such as Hyper-V Server 2008 available from the Microsoft Corporation of Redmond, Wash. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows operating system, available from the Microsoft Corporation. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that the invention is not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable storage media to provide functionality to the storage media. These media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable storage medium may be implemented as computer-readable storage media 406 of FIG. 4 described below (i.e., as a portion of a computing device 400) or as a stand-alone, separate storage medium. It should be appreciated that, as used herein, a "computer-readable media," including "computer-readable storage media," refers to tangible storage media having at least one physical property that may be altered in some way during a process of recording data thereon. For example, a magnetization state of a portion of a physical structure of a computer-readable medium may be altered during a recording process.

Figure 4:
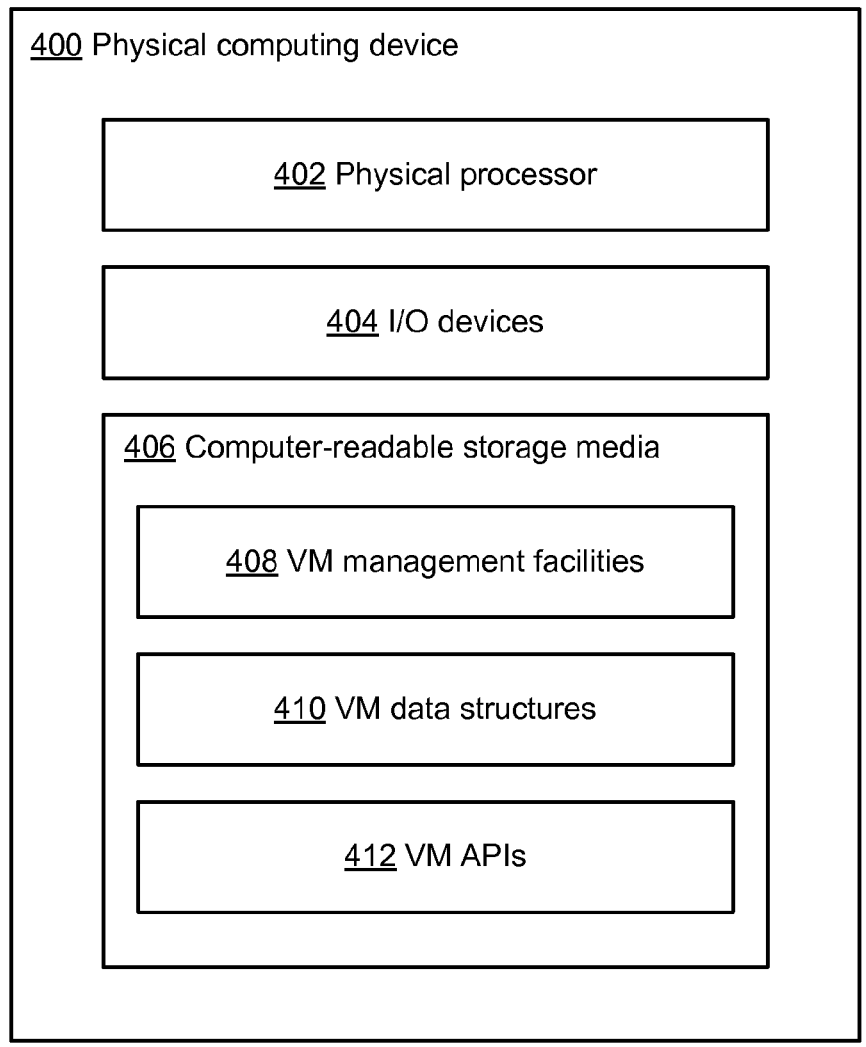
FIG. 4 is a block diagram of an exemplary computing device on which some implementations of the techniques described herein may execute.

In some, but not all, implementations in which the techniques may be embodied as computer-executable instructions, these instructions may be executed on one or more suitable computing device(s) operating in any suitable computer system, including the exemplary computer system of FIG. 4. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

FIG. 4 illustrates one exemplary implementation of a physical computing device (as opposed to a virtual machine) in the form of a computing device 400 that may be used in a system executing a virtual machine environment that implements some or all of the techniques described herein, although others are possible. It should be appreciated that FIG. 4 is intended neither to be a depiction of necessary components for a computing device to operate in accordance with the principles described herein, nor a comprehensive depiction.

Computing device 400 may comprise at least one processor 402, a network adapter 404, and computer-readable storage media 406. Computing device 400 may be, for example, a desktop or laptop personal computer, a server, a mainframe computer, or any other suitable computing device. Input/output (I/O) devices 404 may be any suitable hardware and/or software to enable the computing device 400 to communicate with any other suitable computing device, or any peripheral device that may be connected to a computing device. For example, I/O devices 404 may include user interface devices, such as displays, keyboards, computer mice, etc., and/or may include network adapters to enable computing device 400 to communicate with other computing devices over one or more computer networks, as well as any other suitable I/O devices. Computer-readable media 406 may be adapted to store data to be processed and/or instructions to be executed by processor 402. Processor 402 enables processing of data and execution of instructions. The data and instructions may be stored on the computer-readable storage media 406 and may, for example, enable communication between components of the computing device 400.

The data and instructions stored on computer-readable storage media 406 may comprise computer-executable instructions implementing techniques which operate according to the principles described herein. In the example of FIG. 4, computer-readable storage media 406 stores computer-executable instructions implementing various facilities and storing various information as described above. Computer-readable storage media 406 may store information (e.g., data and/or instructions) relating to a virtual machine environment. For example, computer-readable storage media 406 may include virtual machine management facilities 408 that monitor and direct execution of one or more virtual machines in the virtual machine environment. For example, management facilities 408 may be adapted to enable power management techniques for the virtual machines of the virtual machine environment by informing the guest operating systems of the virtual machines that virtual processors support an idle state. Computer-readable storage media 406 may also store one or more data structures 410 relating to the state, properties, and functionality of one or more virtual machines being executed (or available for execution) in the virtual machine environment. Data structures 410 may include any suitable information, including information on the properties and capabilities of virtual components of each virtual machine (e.g., information on whether virtual processors support an idle state). In some embodiments of the invention, the virtual machine environment may also comprise an Application Programming Interface (API) 412 for the environment and/or management facilities 408; in such embodiments, the computer-readable storage media 406 may further comprise the API 412.

Embodiments of the invention have been described where the techniques are implemented in circuitry and/or computer-executable instructions. It should be appreciated that the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art.

As one example, providing a virtual idle state in which interrupts can be disabled was described in connection with ITTD. A similar approach may be used for other types of interrupts that may be received by a virtual processor for which immediate processing is not acquired in an idle state. However, before responding to another interrupt, the guest OS may perform an initialization routine to create an operating state that is equivalent to the state that would have existed had it responded to the masked interrupts as they occurred. This technique may be used in a guest OS, even if the underlying physical processor does not support an idle state with interrupts disabled.

As another example, it is possible that a similar technique may be employed with a "tickless" operating system, such that an operating system that does not use a periodic timer tick (e.g., a periodic clock interrupt) can be implemented in a virtual machine and on a virtual processor. Operating systems may also be enabled to disable or modify other interrupt signals similarly, when these operating systems detect that a virtual processor is able to be placed into an idle state in which it may woken from the idle state by arrival of an interrupt even when interrupts are masked.

Such alterations, modifications, and improvements are intended to be part of this disclosure, and are intended to be within the spirit and scope of the invention. Accordingly, the foregoing description and drawings are by way of example only.

The invention claimed is:

1. A method performed on at least one computing device, the method comprising:
   intercepting, by a management facility, a query from an operating system of a virtual machine, the query seeking an indication that at least one virtual processor executing the operating system of the virtual machine supports an Advanced Configuration and Power Interface ("ACPI") idle state, where the ACPI idle state comprises a C1 idle state or a C2 idle state; and
   informing, in response to the intercepting, the operating system of the virtual machine that the at least one virtual processor supports the ACPI idle state even if a physical processor of the at least one computing device that is executing the virtual machine does not support the ACPI idle state.

2. The method of claim 1, where the informing further comprises informing the operating system that the at least one virtual processor supports the ACPI idle state in which the at least one virtual processor may be woken from the ACPI idle state by an arrival of an interrupt request even when interrupts are masked.

3. The method of claim 2, where the informing further comprises informing the operating system that the at least one virtual processor supports an ACPI C2 idle state.

4. The method of claim 1, further comprising placing the at least one virtual processor into the ACPI idle state in response to an instruction from the operating system.

5. The method of claim 4, further comprising:
receiving one of the masked interrupt request or the unmasked interrupt request for the at least one virtual processors;
performing at least one initialization step on the at least one virtual processor; and
permitting the virtual processor to carry out a function identified by the masked interrupt request or the unmasked interrupt request.

6. The method of claim 5, where the performing at least one initialization step comprises updating a time record of the at least one virtual processor.

7. The method of claim 1, where the management facility comprises a hypervisor, and further comprising maintaining a status of the at least one virtual processor in state records.

8. The method of claim 1, where the virtual machine is a root partition and the operating system is a host operating system of the at least one computing device.

9. The method of claim 1, wherein the virtual machine is a guest partition and the operating system is a guest operating system.

10. At least one computer storage device comprising: memory storing computer-executable instructions that, when executed by a computing device, cause the computing device to perform actions comprising:
receiving, at a management facility, a query from a guest operating system, the query seeking whether at least one virtual processor of a virtual machine supports an Advanced Configuration and Power Interface ("ACPI") idle state, where the idle state comprises a C1 idle state or a C2 idle state;
informing the guest operating system that the at least one virtual processor does support the ACPI idle state even if a physical processor of the computing device that is executing the virtual machine does not support the ACPI idle state;
placing the at least one virtual processor into the ACPI idle state in response to an instruction from the guest operating system;
receiving an interrupt request for the at least one virtual processors;
performing at least one initialization step on the at least one virtual processor; and
upon completion of the at least one initialization step, permitting the at least one virtual processor to carry out a function identified by the interrupt request.

11. The at least one computer storage device of claim 10, where the performing at least one initialization step comprises updating a time record of the at least one virtual processor.

12. The at least one computer storage device of claim 10, where the placing the at least one virtual processor into the ACPI idle state comprises updating a data structure of the virtual machine to indicate that the at least one virtual processor is in the ACPI idle state.

13. The at least one computer storage device of claim 10, where the informing comprises informing the operating system that the at least one virtual processor supports a C2 idle state of the ACPI.

14. The at least one computer storage device of claim 10, where the informing comprises informing the operating system that the at least one virtual processor supports an ACPI idle state in which the at least one virtual processor may be woken from the ACPI idle state by the arrival of an interrupt request even when interrupts are masked.

15. The at least one computer storage device of claim 10, where the permitting the at least one virtual processor to carry out the function comprises executing the function with the management facility.

16. The at least one computer storage device of claim 10, where the management facility comprises a hypervisor and a root partition.

17. A system comprising at least one computing device and at least one software module that are together configured for performing actions comprising:
intercepting, by a management facility, a query from a guest operating system of a virtual machine, the query seeking an indication that at least one virtual processor executing the guest operating system supports an Advanced Configuration and Power Interface ("ACPI") idle state, where the ACPI idle state comprises a C1 idle state or a C2 idle state; and
informing the guest operating system that the at least one virtual processor does support the ACPI idle state even if a physical processor of the at least one computing device does not support the ACPI idle state.

18. The system of claim 17, Where informing the guest operating system that the at least one virtual processor does support the ACPI idle state comprises informing the guest operating system that the at least one virtual processor supports the ACPI idle state in which the at least one virtual processor may be woken from the ACPI idle state by the arrival of an interrupt request even when interrupts are masked.

19. The system of claim 18, where informing comprises informing the guest operating system that the at least one virtual processor supports a C2 idle state of the ACPI.

20. The system of claim 17, where the actions further comprise:
placing the at least one virtual processor into the ACPI idle state in response to an instruction from the guest operating system;
receiving an interrupt request for the at least one virtual processors;
performing at least one initialization step on the at least one virtual processor; and
permitting the virtual processor to carry out a function identified by the interrupt request.

* * * * *